(12) United States Patent
Chastain

(10) Patent No.: US 6,616,924 B1
(45) Date of Patent: Sep. 9, 2003

(54) STABILIZED RICE BRAN DEER FEED, ATTRACTANT AND BROWSE SUPPLEMENT

(75) Inventor: Jason N. Chastain, Stuttgart, AR (US)

(73) Assignee: Producers Rice Mill, Inc., Stuttgart, AR (US)

( * ) Notice: Subject to any disclaimer, the term of this patent is extended or adjusted under 35 U.S.C. 154(b) by 0 days.

(21) Appl. No.: 09/585,614

(22) Filed: Jun. 2, 2000

Related U.S. Application Data

(60) Provisional application No. 60/137,498, filed on Jun. 4, 1999.

(51) Int. Cl.[7] .................. A61K 35/78; A23K 1/175; A23K 1/18
(52) U.S. Cl. .................. 424/84; 424/439; 424/442; 424/750; 424/687; 426/1; 426/2; 426/72; 426/541; 426/543; 426/618; 426/623; 426/648; 426/807
(58) Field of Search .................. 424/84, 439, 442, 424/750, 687; 426/72, 541, 543, 618, 623, 648, 807, 1, 2

(56) References Cited

U.S. PATENT DOCUMENTS

| | | | |
|---|---|---|---|
| 3,259,501 A | 7/1966 | Ulrey .................. | 426/69 |
| 3,421,898 A | 1/1969 | Erwin et al. .................. | 514/723 |
| 3,512,986 A | 5/1970 | Snyder et al. .................. | 426/2 |
| 3,658,549 A | 4/1972 | Geiersberger et al. .................. | 426/2 |
| 4,044,169 A | 8/1977 | Bertram et al. .................. | 426/656 |
| 4,426,921 A * | 1/1984 | Meinardus .................. | 99/519 |
| 5,270,062 A | 12/1993 | Buchs .................. | 426/72 |
| 5,292,537 A * | 3/1994 | Hammond .................. | 426/44 |
| 5,300,297 A | 4/1994 | Ueda et al. .................. | 424/438 |
| 5,496,572 A | 3/1996 | Rudden .................. | 426/74 |
| 5,532,008 A | 7/1996 | Sasaoka et al. .................. | 426/73 |

OTHER PUBLICATIONS

Marshall, W.E. et al. (eds.). Rice Science and Technology. Marcel Dekker, Inc. (New York), 1994, pp. 382–404.*
Chemical Abstracts 84:178690, 1976.*
PROMT abstract 95: 415751, 1995.*
PROMT abstract 96: 308779, 1996.*
PROMT abstract 1998: 101331, 1998.*
CABA Abstract 87: 110025, 1987.*

* cited by examiner

*Primary Examiner*—John Pak
(74) *Attorney, Agent, or Firm*—James Creighton Wray; Meera P. Narasimhan

(57) ABSTRACT

Deer attractant and feed comprising stabilized rice bran and calcium carbonate is disclosed. Limestone is added to the rice during the milling process. The residue from this process, rice bran and a small amount of pulverized limestone, is the cooked in an extruder, resulting in stabilized rice bran. The extrusion process destroys lipase activity and reduces the free fatty acid content to under 4%. The product contains about 12.5% or more protein, and preferably has a 2:1 ratio of calcium to phosphorous. Because of the balanced nutritional analysis and the addition of calcium carbonate to the feed, the product aids in promoting overall deer growth as well as bone growth in bucks. The product also acts as a deer attractant, moving deer toward sources of adequate food supplies and away from cultivated gardens and crops.

10 Claims, 2 Drawing Sheets

STABILIZED RICE BRAN DEER FEED, ATTRACTANT AND BROWSE SUPPLEMENT

This application claims the benefit of U.S. Provisional Application No. 60/137,498, filed Jun. 4, 1999.

BACKGROUND OF THE INVENTION

Traditional deer feeds and attractants, such as corn and salt, are not optimal for deer's health. Regulations have been enacted, such as those adopted by the Texas A&M Animal Health Divisions, concerning the use of feed grains contaminated by aflatoxins.

Needs exist for deer feeds and attractants that are beneficial to deer and herds.

SUMMARY OF THE INVENTION

The present invention is for deer attractant and feed comprising mostly of stabilized rice bran.

Briefly, the present invention provides deer attractant and feed comprising stabilized rice bran and calcium carbonate. Limestone is added to the rice during the milling process. A byproduct residue from the milling process is rice bran and a small amount of pulverized limestone. Rice bran is a byproduct of rice milling that contains the seed coat, a fraction of the grain removed in milling, and the germ. Rice bran is a source of Vitamin $B_1$, Thiamine, which is found in animal organ tissues and functions in the body as a carboxylase, which is essential for conversion of carbohydrate to fat. The rice bran, preferably, is sieved for purity and is heated, cooked and extruded, resulting in stabilized rice bran flakes. The extrusion process destroys lipase activity and reduces the free fatty acid content to under 4%. The product contains about 12.5% or more protein, and about a 2:1 ratio of calcium (between about 3.25–4.25%) to phosphorous (minimum of 1.75%). The naturally occurring Vitamin $B_1$, Thiamine, aids in converting carbohydrates from browsing into fat as stored energy. The resulting attractant and feed promote deer health and growth, and the growth of antlers as well. The attractant promotes stronger does and bucks, which promotes healthier, better offspring. The deer feed may be spread out in the wild for deer to eat to cause herd distribution throughout resource areas and away from crops and gardens.

Rice bran is the outer brown layer of the rice kernel that is removed during the milling process, which generates the familiar white rice. Attached is a diagram of the rice kernel and its parts. The bran portion is one of the most nutritious parts of the rice kernel. The process of removing the bran layer from the kernel includes the addition of ground limestone, the powders remain as a source of calcium. The raw rice bran is taken as soon as it is removed from the kernel. The product is sieved in order to get to the purest parts of the rice bran. That aids in raising the fat levels. At that point, the bran must be stabilized. The rice bran is quickly brought to the heating, cooking and pressure extruding stabilizer. This must be done as quickly as possible to meet the standard definition of stabilized rice bran, which mandates that free fatty acids (FFA) be under 4%. The resultant stabilized bran flakes are cooled in a cooling system before packaging. The resultant product is packaged and sold as a deer attractant and feed.

There is no stabilized rice bran being sold in the deer attractant/feed/supplement market. Virtually all unstabilized rice bran goes into feed production for poultry and livestock. There is also a rapidly growing market for stabilized rice bran for the equine feed/supplement market.

The stabilized rice bran for the deer market has the following analysis:

|  | Preferred |
| --- | --- |
| Crude protein | 12.5% minimum |
| Crude fat | 20.0% minimum |
| Crude fiber | 13.0% maximum |
| Calcium | 3.25% minimum |
| Calcium | 4.25% maximum |
| Phosphorous | 1.75% minimum |
| Free fatty acids | 4.0% maximum |

Because of the balanced nutritional analysis and the addition of calcium carbonate to the feed, the product aids in promoting overall deer growth as well as bone growth in bucks. Preferably, the calcium to phosphorous ratio is about 2:1.

The new product promotes wild herd management by attracting strong and healthy bucks and does into deer management areas.

Rice bran was originally developed as a commercial animal feed source. Through research and development, the present invention was found to be a unique food source for deer. Testing has shown huge successes in antler development, soft tissue development, hair coat and general overall animal health.

The present invention has a unique aroma that is attractive to deer and only contains about 2% or less salt. The present invention has only minute traces of aflatoxins and very low concentrations of salt (about 2% or less). This makes the present invention a very unique product, not only for deer but also for other wildlife that are susceptible to aflatoxins.

The present invention is unique to the stabilized rice bran market in that ground limestone is used as a milling agent in the removal of raw bran from the grain. The milling agent, in turn, provides the present invention with a balanced calcium to phosphorous ratio. A balanced calcium to phosphorous ratio is essential for organ and bone development in deer.

By controlling the free fatty acid to a very low level, the feed of the present invention is prevented from going through any chemical changes while being stored thereby providing an all natural product to the market.

The U.S. Rice Industry and the American Medical Association have done research showing that the use of rice bran leads to a lowering of bad cholesterol levels. The high fat content of the present invention makes the product a high-energy food source that is essential for survival of wintering deer herds.

These and further and other objects and features of the invention are apparent in the disclosure, which includes the above and ongoing written specification, with the claims and the drawings.

DETAILED DESCRIPTION OF THE PREFERRED EMBODIMENTS

The present invention is for deer feed comprising mostly of stabilized rice bran. Limestone is added to the rice bran during the milling process. The residue from this process, rice bran and a small amount of pulverized limestone, is then cooked in an extruder, resulting in stabilized rice bran. The extrusion process destroys lipase activity and reduces the free fatty acid content to under 4%. The product contains about 12.5% or more protein, and about a 2:1 ratio of calcium (between about 3.25–4.25%) to phosphorous (minimum of 1.75%). The resulting feed not only promotes deer growth, but promotes the growth of antlers as well. The deer feed may be spread out in the wild for deer to eat.

Figure 1:
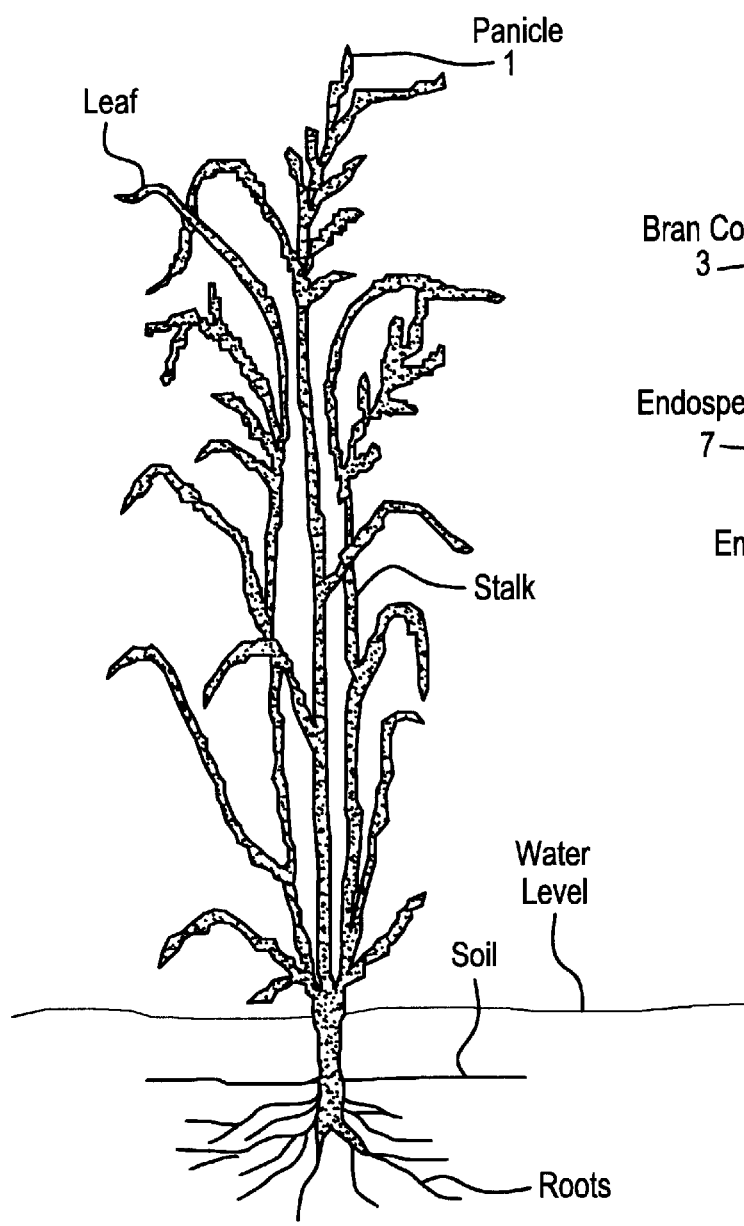
FIG. 1 is a diagram of a rice plant.
Figure 2:
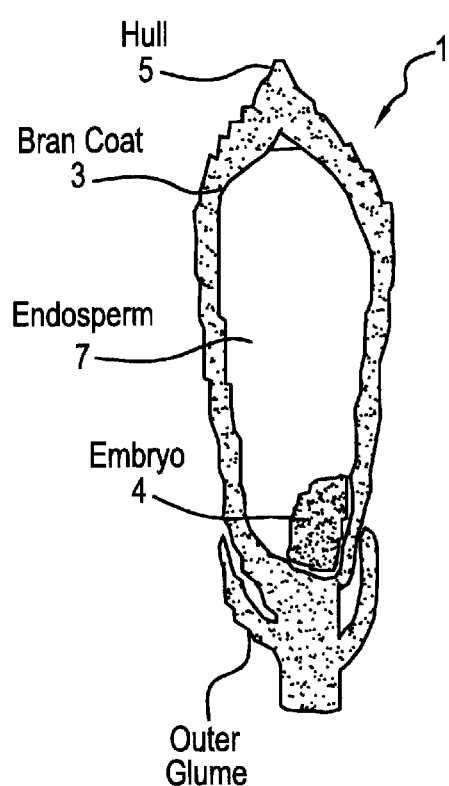
FIG. 2 is a diagram of a rice kernel.

As shown in FIGS. 1 and 2, rice bran 3 is the outer brown layer of the rice kernel 1 that is removed during the milling process, which also removes the outer hull 5 and the germ or embryo 4 from the rice kernel 1. This process generates the familiar white rice 7. The bran portion 3 is one of the most nutritious parts of the rice kernel 1. The process of removing the bran layer 3 from the kernel 1 includes the addition of ground limestone, which is a source of calcium.

Figure 3:
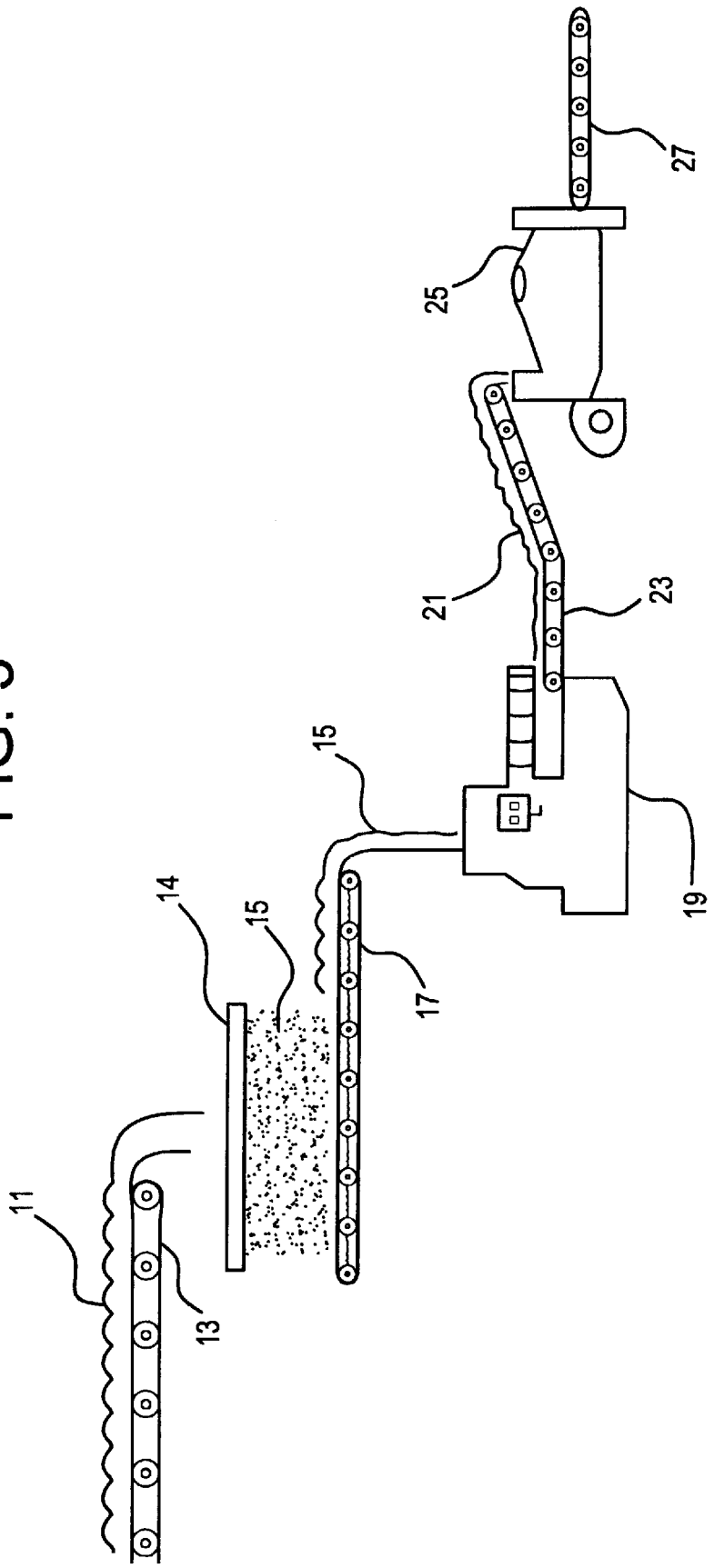
FIG. 3 is a schematic of the process for producing deer feed.

As shown in FIG. 3, raw rice bran 11 and residual limestone fines are processed as soon as they are removed from the rice kernel's endosperm. A belt 13 removes the bran and residual limestone fines from the milling machine. The raw rice bran 11 and fines are brought by the belt 11 to a sieving table 14. There the product is sieved by a reciprocating screen to get to the purest parts 15 of the rice bran. The sieving aids in raising the fat levels of the resulting product. The pure rice bran 15 and limestone fines are dropped to an auger 17 and are fed to an extruder 19 where the product is rapidly heated and cooked by high pressure steam and thereby stabilized. Preferred stabilizing equipment is supplied by Insta-Pro. The heated rice bran is compressed and then extruded. The flakes of the stabilized rice bran 21 are then quickly transferred by a belt 23 through dry air to a low temperature cooling system 25. The cooling system rapidly drops the temperature of the flakes, removes residual moisture, and discharges the flakes at ambient temperature. The cooled, stabilized rice bran flakes 21 exit the cooler 25 on a belt 27 to be packaged. The rice bran must be moved as quickly as possible to the extruder 19 and cooler 25 in order to meet the standard definition of stabilized rice bran, which mandates that free fatty acids (FFA) be under 4%.

No calcium fortified stabilized rice bran 21 has been or is being sold in the deer feed/supplement market. Virtually all unstabilized rice bran goes into feed production for poultry and livestock. There is also a rapidly growing market for stabilized rice bran for equine feed/supplement.

An example of the stabilized rice bran flakes 21 for the deer feed market has the following analysis:

| | |
|---|---|
| Crude protein (min.) | 12.5% |
| Crude fat (min.) | 20.0% |
| Crude fiber (max.) | 13.0% |
| Calcium (max.) | 4.25% |
| Calcium (min.) | 3.25% |
| Phosphorous (min.) | 1.75% |
| Free fatty acids (max.) | 4.00% |

Because of the balanced nutritional analysis and the addition of calcium to the feed, the product aids in promoting strong organs, fat production, overall deer growth and bone growth, as well as antler growth in bucks.

Deer are ruminant mammals of the family Cervide that browse on bushes, twigs and branches of deciduous evergreen and semi-evergreen shrubs, bushes and trees, and as a result take in copious carbohydrates. Surprisingly, the Thiamine, Vitamin $B_1$, in the new deer attractant and feed assists in converting the carbohydrates to stored energy in the form of body fat and builds strong organ tissues, while the high oil/fat content of the rice bran flakes contributes to the nutrition and coats of the animals, promoting health. The powdered calcium carbonate in the feed provides bone growth and density and antler growth, and the calcium-phosphate balance contributes to muscle development, which together make strong, healthy, large deer.

While the invention has been described with reference to specific embodiments, modifications and variations of the invention may be constructed without departing from the scope of the invention, which is defined in the following claims.

I claim:

1. A method of attracting and feeding deer comprising depositing on the ground throughout forested areas a deer attractant and natural browse supplement, wherein the deer attractant and natural browse supplement comprises stabilized rice bran, which contains a minimum of 12.5% by weight crude protein, a minimum of 20% by weight crude fat, a maximum of 13% by weight crude fiber, between about 3.25–4.25% by weight calcium, a minimum of 1.75% by weight phosphorous, and a maximum of 4% by weight free fatty acids, for use as a deer attractant and natural browse supplement for drawing deer away from populated areas into managed areas and for promoting growth, soft tissue, organ, bone and antler development in native deer.

2. The method of claim 1, wherein the deer attractant and natural browse supplement is produced by the process of:
    (a) adding ground limestone to rice kernels;
    (b) removing a bran layer from each rice kernel;
    (c) transferring removed bran and residual limestone fines on a belt to a sieving table;
    (d) sieving the bran and limestone mixture to obtain a mixture of limestone fines and pure rice bran;
    (e) feeding the sieved mixture to an extruder;
    (f) rapidly heating and cooking the mixture with high pressure steam to stabilize the rice bran;
    (g) compressing the hot mixture;
    (h) extruding the hot mixture;
    (i) forming the extruded hot mixture into pieces;
    (j) transferring the hot pieces on a belt to a cooling system;
    (k) cooling the hot pieces, thereby removing residual moisture from the pieces;
    (l) discharging the cooled and dried pieces when they have reached ambient temperature; and
    (m) packaging the dried pieces as deer natural browse supplement and attractant,
wherein process steps (a) to (l) are carried out to provide stabilized rice bran which contains a minimum of 12.5% by weight crude protein, a minimum of 20% by weight crude fat, a maximum of 13% by weight crude fiber, between about 3.25–4.25% by weight calcium, a minimum of 1.75% by weight phosphorous, and a maximum of 4% by weight free fatty acids.

3. The method of claim 1, wherein the deer attractant and natural browse supplement has a 2:1 ratio by weight of calcium to phosphorous.

4. The method of claim 1, further comprising providing the supplement periodically in trails of increasing distance away from human populated areas, roads, fields of cultivated crops and gardens.

5. A method of feeding deer comprising depositing throughout forested areas a deer natural browse supplement, wherein the deer natural browse supplement comprises stabilized rice bran, which contains a minimum of about 12.5% by weight crude protein, a minimum of about 20% by weight crude fat, a maximum of about 13% by weight crude fiber, between about 3.25%–4.25% by weight calcium, a minimum of about 1.75% by weight phosphorous, and a maximum of about 4% by weight free fatty acids, for use as a natural browse supplement for promoting growth, soft tissue, organ bone and antler development in native deer.

6. The method of claim 5, wherein the deer natural browse supplement is produced by the process of:
(a) adding ground limestone to rice kernels;
(b) removing a bran layer from each rice kernel;
(c) transferring removed bran and residual limestone fines on a belt to a sieving table;
(d) sieving the bran and limestone mixture and obtaining a mixture of limestone fines and pure rice bran;
(e) feeding the sieved mixture to an extruder;
(f) rapidly heating and cooking the mixture with high pressure steam and stabilizing the rice bran;
(g) compressing the hot mixture;
(h) extruding the hot mixture;
(i) forming the extruded hot mixture into pieces;
(j) transferring the hot pieces on a belt to a cooling system;
(k) cooling the hot pieces, removing residual moisture from the pieces;
(l) discharging the cooled and dried pieces when they have reached ambient temperature; and
(m) packaging the dried pieces as deer natural browse supplement, wherein process steps (a) to (l) are carried out to provide stabilized rice bran which contains a minimum of 12.5% by weight crude protein, a minimum of 20% by weight crude fat, a maximum of 13% by weight crude fiber, between about 3.25–4.25% by weight calcium, a minimum of 1.75% by weight phosphorous, and a maximum of 4% by weight free fatty acids.

7. The method of claim 5, wherein the feed supplement further comprises about 2:1 ratio by weight of calcium to phosphorous.

8. The method of claim 5, further comprising providing the supplement in deer feed.

9. A method of attracting deer and supplementing natural browse comprising distributing on the ground throughout forested areas a deer attractant and natural browse supplement which contains stabilized rice bran with crude protein, crude fat, crude fiber, calcium, phosphorous and free fatty acids used as a deer attractant and natural browse supplement, drawing deer away from populated areas into managed areas and promoting growth in native deer and soft tissue, organ, bone and antler development in native deer, wherein the stabilized rice bran is produced with limestone and includes a protein content of a minimum of 12.5% by weight, a calcium content of between about 3.25–4.25% by weight, a phosphorous content of a minimum of 1.75% by weight, and free acid content of less than 4% by weight.

10. A method of attracting deer and supplementing natural browse comprising distributing on the ground throughout forested areas a deer attractant and deer natural browse supplement used as a deer attractant and natural browse supplement, drawing deer away from populated areas into managed areas and promoting growth in native deer and soft tissue, organ, bone and antler development in native deer, wherein the supplement comprises stabilized rice bran produced with limestone and includes a protein content of a minimum of 12.5% by weight, a calcium content of between about 3.25–4.25% by weight, a phosphorous content of a minimum of 1.75% by weight, and free acid content of less than 4% by weight.

* * * * *

UNITED STATES PATENT AND TRADEMARK OFFICE
CERTIFICATE OF CORRECTION

PATENT NO.     : 6,616,924 B1
DATED          : September 9, 2003
INVENTOR(S)    : Jason N. Chastain It is certified that error appears in the above-identified patent and that said Letters Patent is hereby corrected as shown below:

<u>Title page,</u>
Item [*] Notice, should read:
-- Subject to any disclaimer, the term of this patent is extended or adjusted under 35 U.S.C. 154(b) by 29 days. --

Signed and Sealed this

Twenty-third Day of December, 2003

JAMES E. ROGAN
*Director of the United States Patent and Trademark Office*